United States Patent [19]

Leto et al.

[11] Patent Number: 5,720,459
[45] Date of Patent: Feb. 24, 1998

[54] SUPPORT AND ADJUSTMENT SYSTEM FOR SUPPORTING A STRUCTURE FROM A BASE

[75] Inventors: Alfonso Leto; Hans Naepflin, both of Manhattan Beach, Calif.

[73] Assignee: Hughes Electronics, Los Angeles, Calif.

[21] Appl. No.: 435,248

[22] Filed: May 5, 1995

[51] Int. Cl.$^6$ ...................................................... E04G 3/00
[52] U.S. Cl. .................... 248/274.1; 248/276.1; 248/288.31; 248/663
[58] Field of Search ............... 248/276.1, 284.1, 248/288.3, 288.51, 292.14, 181.1, 181.2, 183.2, 176.3, 346.03, 346.05, 346.06, 663, 165, 432, 274.1; 269/75, 309; 359/896

[56] References Cited

U.S. PATENT DOCUMENTS

| | | | |
|---|---|---|---|
| 1,169,049 | 1/1916 | McPeak | 248/165 |
| 1,186,428 | 6/1916 | Newman | 248/276.1 |
| 2,828,589 | 4/1958 | Hercik | 248/181.2 X |
| 2,832,557 | 4/1958 | Reinert | 248/276.1 |
| 2,861,501 | 11/1958 | Strelakos | 248/276.1 X |
| 3,112,570 | 12/1963 | Vasconcellos | 248/165 |
| 3,353,771 | 11/1967 | Bow | 248/663 X |
| 4,034,946 | 7/1977 | Zimmer, Jr. | 248/183.2 |
| 4,647,434 | 3/1987 | Ayers et al. | 248/288.31 X |
| 4,700,919 | 10/1987 | Saunders, IV | 248/228.31 |

FOREIGN PATENT DOCUMENTS

| 2903621 | 8/1980 | Germany | 240/288.31 |
|---|---|---|---|

OTHER PUBLICATIONS

Grafstein & Schwarz, *Pictorial Handbook of Technical Devices*, Chemical Publishing Co., Inc. 1971, pp. 16–17 and 112–113.

*Primary Examiner*—Leslie A. Braun
*Assistant Examiner*—Anita M. King
*Attorney, Agent, or Firm*—Gordon R. Lindeen, III; Michael W. Sales; Wanda K. Denson-Low

[57] ABSTRACT

A support and adjustment system includes a supported structure, a support base, three supports extending between the supported structure and the support base. Each support includes a hinge pin fixed to the supported structure, a leg, a hinge swivel dimensioned to engage the hinge pin at the first end of the leg, and a spherical ball at the second end of the leg. A socket member includes a first end having a socket dimensioned to receive the spherical ball therein and further includes a second end. The second end of the socket member is adjustably supported from the support base.

20 Claims, 6 Drawing Sheets

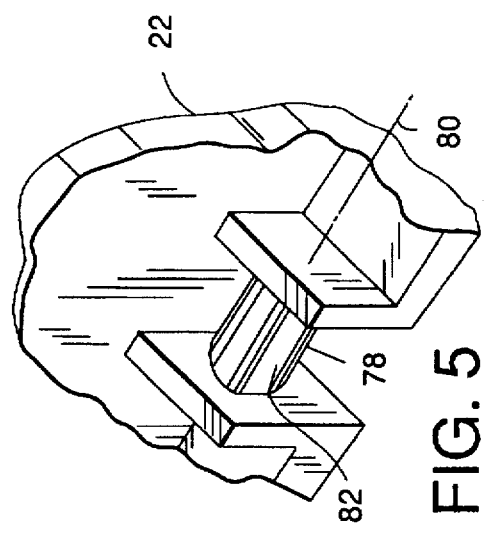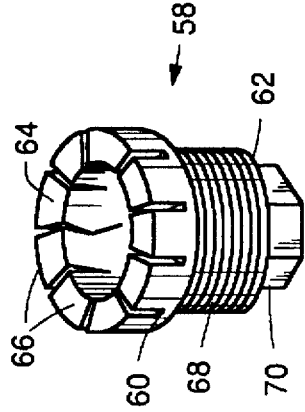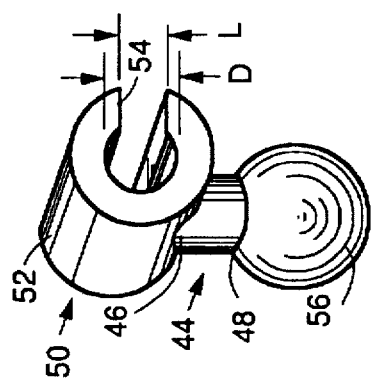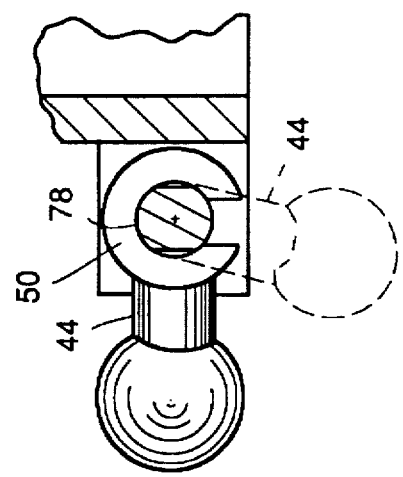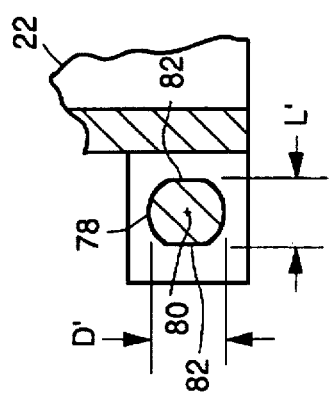

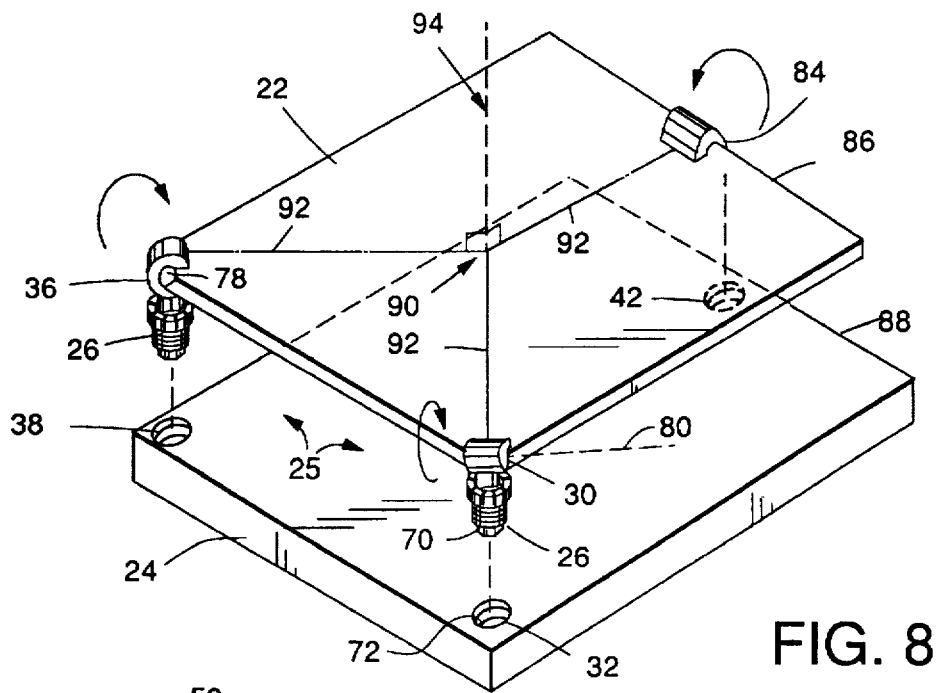
FIG. 8
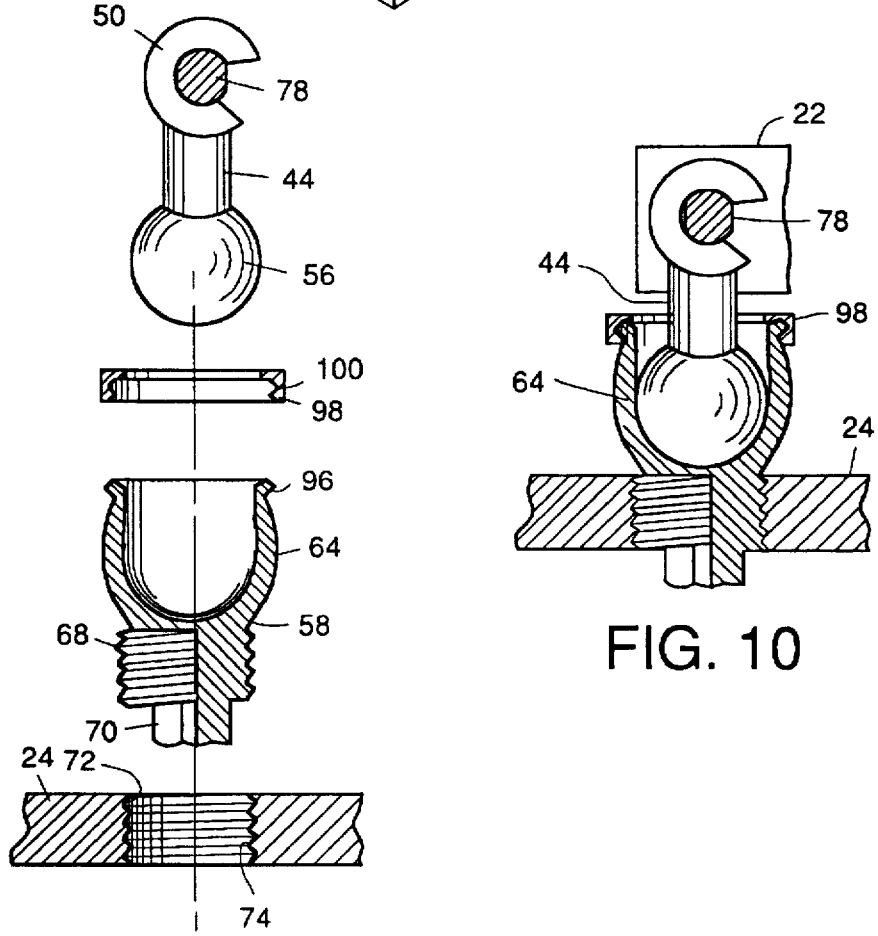
FIG. 9
FIG. 10

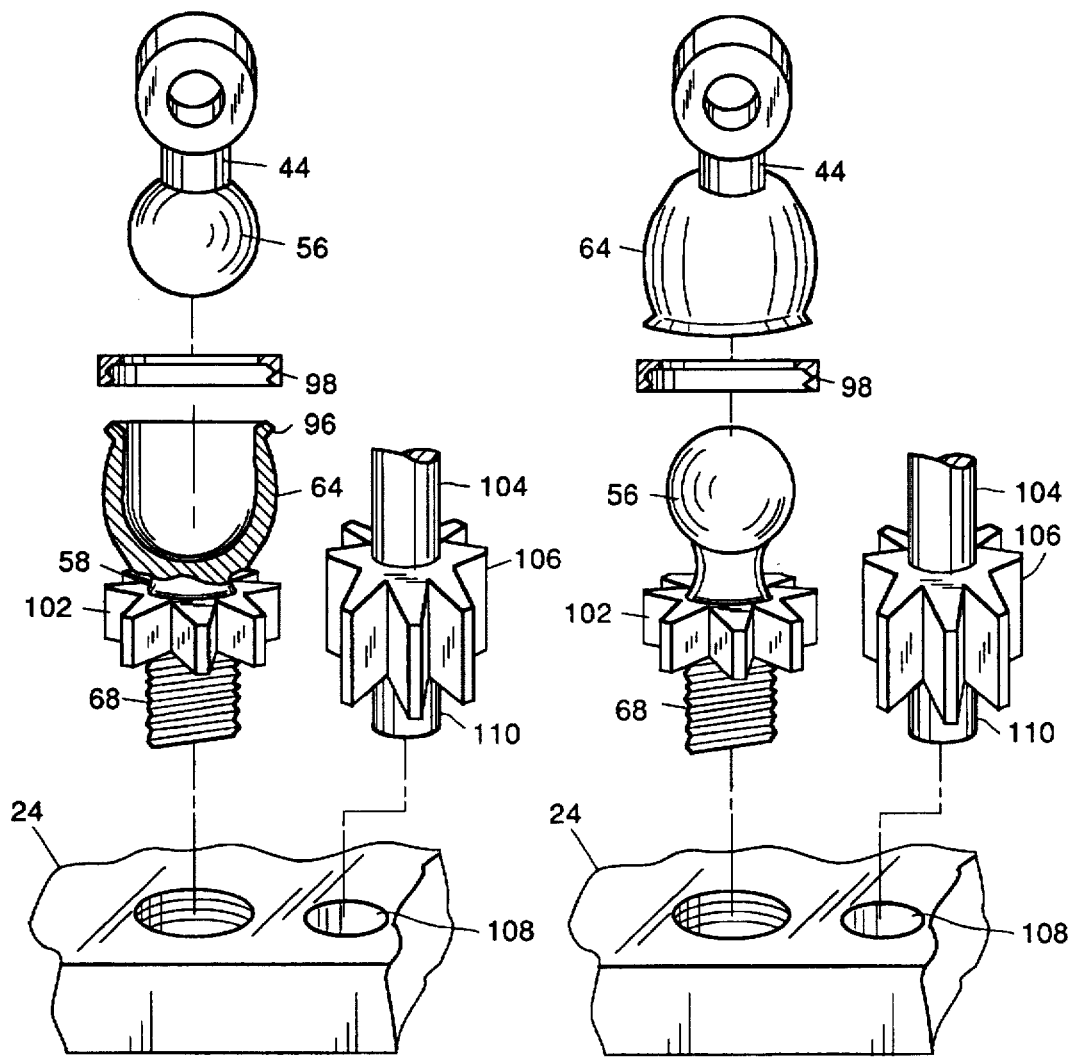
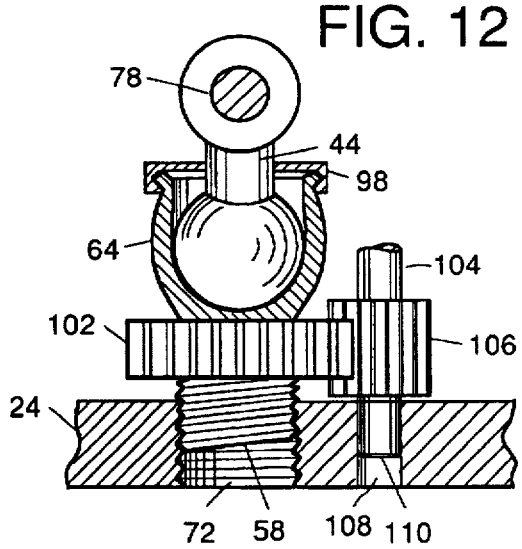
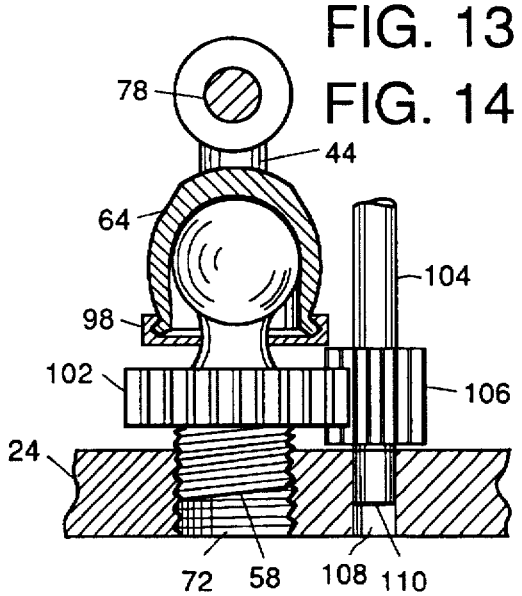
FIG. 11   FIG. 12
FIG. 13   FIG. 14

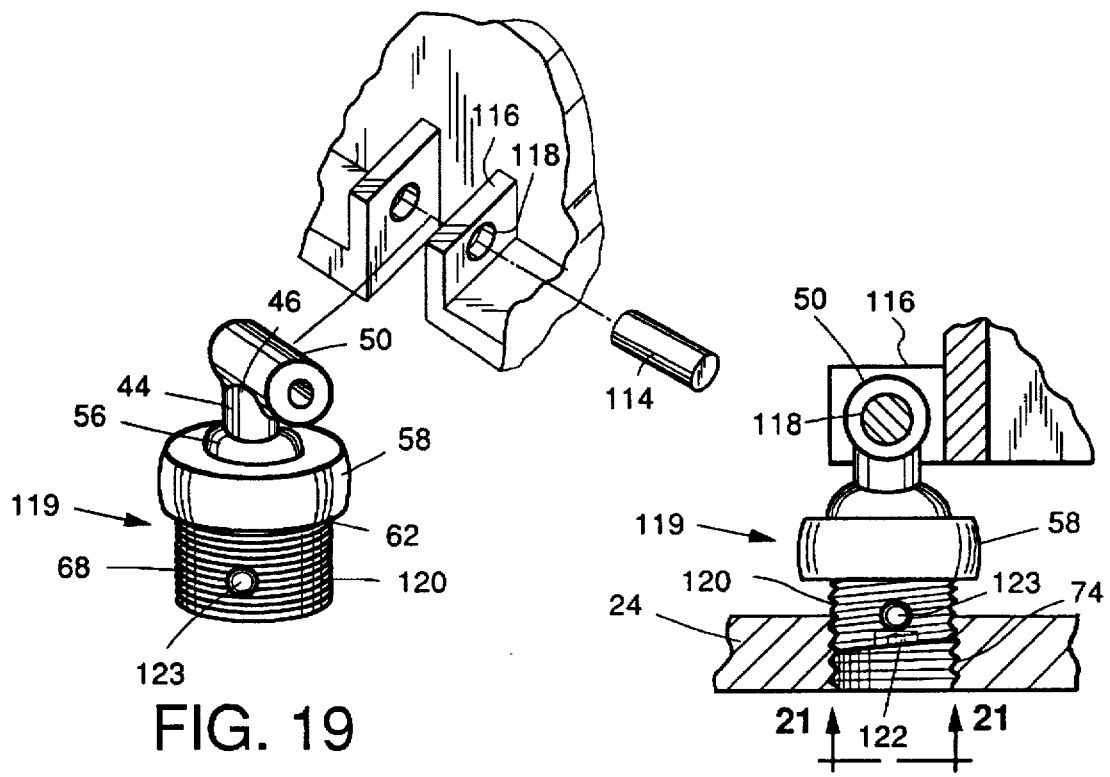
FIG. 19
FIG. 20
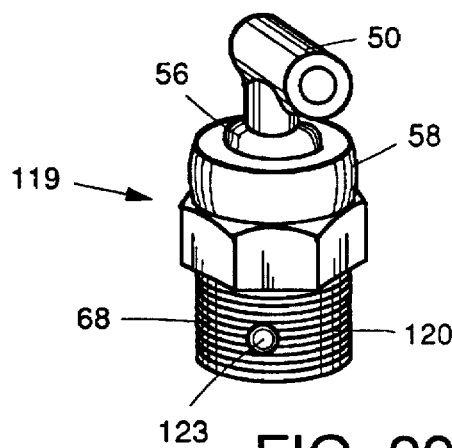
FIG. 22
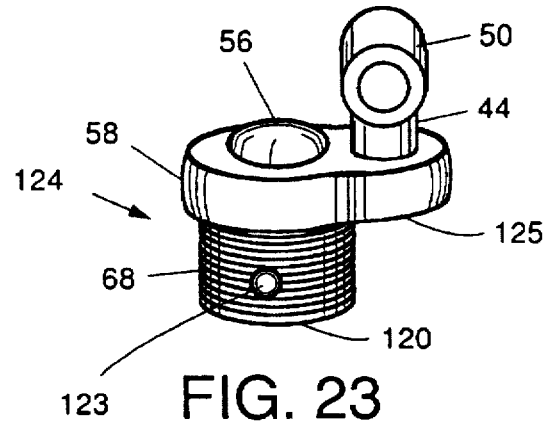
FIG. 21
FIG. 23

SUPPORT AND ADJUSTMENT SYSTEM FOR SUPPORTING A STRUCTURE FROM A BASE

BACKGROUND OF THE INVENTION

This invention relates to a support system for supporting a structure from a base, and, more particularly, for adjustably supporting an optics assembly from its base on triangularly arranged legs.

In assembling and aligning optical devices, it is often required to precisely position an optical assembly relative to a support base, sometimes termed the optical bench. The optical assembly must be carefully aligned with respect to another structure. The alignment must be maintained initially and through extended service in a variety of applications and sometimes—harsh environments. Vibrations, shocks, and temperature changes (working through the differences in coefficients of thermal expansion of the components) can all lead to loss of alignment during service.

It has been conventional to mount and adjust optical assemblies using spring-loaded supports. The optical assembly is biased against a stop with a spring, and adjustment is achieved by moving the stop. In such a support system, the spring must be carefully selected to overcome any resonant frequency vibrations. The mounting also relies on some degree of sliding friction to overcome tilt of the mounting, which may induce stress and distort the optical assembly, particularly where plastic optical components are used. Although straightforward in concept, practical spring-loaded support structures often require numerous pieces, which are expensive to produce and require great care in assembling the support to avoid mistakes.

There is therefore a need for an improved approach for adjustably mounting optical assemblies and other types of precision devices. The present invention fulfills this need, and further provides related advantages.

SUMMARY OF THE INVENTION

The present invention provides a support and adjustment system useful for supporting structures. The system of the invention holds the supported structure securely in a manner that permits its precise adjustment and positioning, without the introduction of stresses and strains into the supported structure. The support and adjustment system is compliant to accommodate dimensional changes in the supported system arising from, for example, the difference in coefficients of thermal expansion of the components and supported structure. The ability to accommodate such dimensional changes is important when the supported structure is an optical assembly, the application of most interest to the inventors, and particularly important when the optical assembly is made in part of plastic optical elements. No springs are required or used in the support and adjustment system. The system of the invention has few parts, which may be fabricated inexpensively, and which are readily assembled in only a single manner that avoids assembly errors.

In accordance with the invention, a support and adjustment system comprises a supported structure, a support base, and means for supporting the supported structure from the support base. The means for supporting includes a support having a hinge pin fixed to the supported structure and a leg having a first end and a second end. The leg includes a hinge swivel dimensioned to engage the hinge pin at the first end of the leg, and a spherical ball at the second end of the leg. The means for supporting further includes a socket member including a first end having a socket dimensioned to receive the spherical ball therein and further including a second end, and means for adjustably joining the second end of the socket member to the support base.

In a particularly preferred embodiment, a support and adjustment system comprises a supported structure, such as an optical assembly, having a first support location, a second support location, and a third support location. The three support locations lie in a supported structure plane. Three planes, each plane passing through one of the support locations and lying perpendicular to the supported structure plane, intersect along a common line that is perpendicular to the supported structure plane at a supported structure intersection location. A support base has a first base location, a second base location, and a third base location, the three base locations lying in a base plane. The supported structure plane is generally parallel to the base plane. A first support extends between the first support location and the first base location, a second support extends between the second support location and the second base location, and a third support extends between the third support location and the third base location. Each support comprises a hinge pin fixed to the supported structure and having a cylindrical surface with a cylindrical axis thereon. The cylindrical axis of the hinge pin lies in the supported structure plane and is perpendicular to a line extending from the supported structure intersection location to the support location. Each support further includes a leg lying in a plane perpendicular to the supported structure plane, and preferably lying perpendicular to the supported structure plane, and including a first end and a second end. The leg has a hinge swivel dimensioned to receive the hinge pin therein at the first end of the leg, and a spherical ball at the second end of the leg. A socket member includes a first end and a second end. The socket member has a socket dimensioned to receive the spherical ball therein at the first end, and an external thread at the second end. A bore in the support base has a bore axis lying perpendicular to the base plane. The bore is internally threaded with a matching thread to the external thread at the second end of the socket member.

The hinge arrangement at the first end of the support, in combination with the ball-and-socket at the second end of the support, permit the leg to pivot outwardly and inwardly in a plane perpendicular to the hinge pin and to both the planes of the support base and the supported structure. The pivoting movement of the support can be viewed as essentially moving radially in a plane perpendicular to the supported structure plane. Importantly, the pivoting planes through each of the legs intersect in a common line which is perpendicular to the plane of the supported structure. Strains can therefore be accommodated. The height and angular orientation of the supported structure plane relative to the base plane is adjusted and set by rotating the socket member in the threaded bore. Because the three supports are independently adjustable and can accommodate strains, the supported structure can be precisely positioned.

The leg and socket member of each support can be readily fabricated from metal by an inexpensive process such as die casting or from plastic by the inexpensive injection molding process. In a preferred form wherein assembly flats are provided on the hinge pin, the support can be assembled to the hinge pin in only one way, minimizing the chance for error in assembly.

The present invention provides a useful advance in the art of adjustably supporting structures such as optical assemblies. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a perspective view of a leg used in the support;

FIG. 4 is a perspective view of a socket member used in the support;

FIG. 5 is a perspective view of a hinge pin;

FIG. 6 is a sectional view of the hinge pin of FIG. 5;

FIG. 7 is an elevational view of the leg being assembled to the hinge pin, which is shown in section;

FIG. 8 is a partially exploded schematic perspective view of the support and adjustment system;

FIG. 9 is an exploded elevational view, with a portion shown in section, of another embodiment of the support;

FIG. 10 is a sectional view of the embodiment of FIG. 9, after assembly;

FIG. 11 is an exploded perspective view of another embodiment of the invention having an adjustment tool;

FIG. 12 is a sectional view of the embodiment of FIG. 11, after assembly;

FIG. 13 is an exploded perspective view of another embodiment of the invention having an adjustment tool;

FIG. 14 is a sectional view of the embodiment of FIG. 13, after assembly;

FIG. 19 is perspective partially exploded view of another embodiment of the hinge pin and support;

FIG. 20 is a sectional view of the hinge pin and support of FIG. 19;

FIG. 21 is a bottom view, taken along lines 21—21, of the support of FIG. 20;

FIG. 22 is a perspective view of another embodiment of the support; and

FIG. 23 is a perspective view of another embodiment of the support.

DETAILED DESCRIPTION OF THE INVENTION

Figure 1:
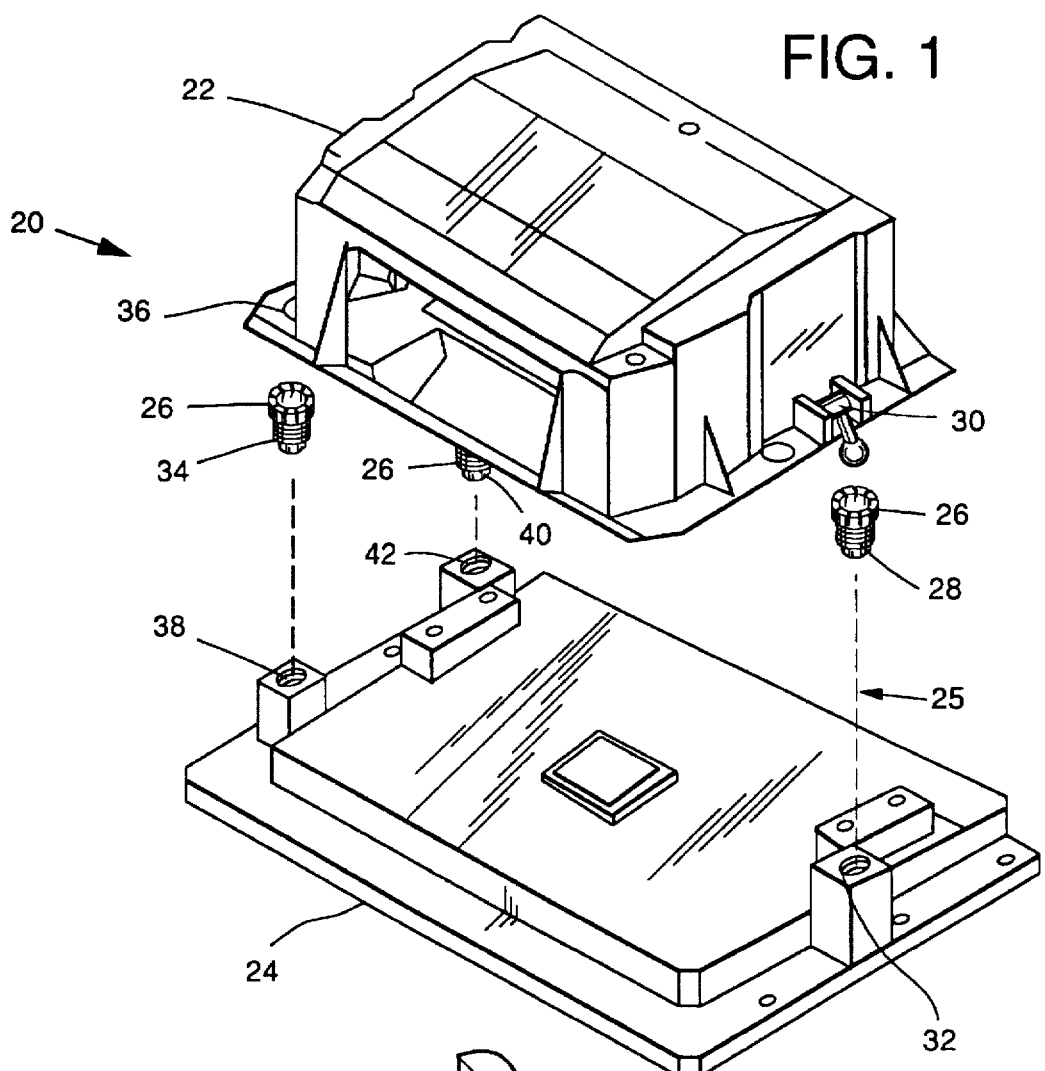
FIG. 1 is a perspective exploded view of a support and adjustment system.

FIG. 1 illustrates a support and adjustment system 20. The system 20 includes a first structure, illustrated as a supported structure 22 that is an optical assembly in the application of most interest to the inventors. The system further includes a second structure, illustrated as a support base 24. The detailed internal structure of the supported structure 22 is not a part of the invention, which is operable with a wide variety of such structures 22.

The supported structure 22 is supported from the support base 24 by a support device 25 that includes at least one, and most preferably three, supports 26, arranged in a triangular pattern. A first support 28 extends between a first support location 30 on the supported structure 22 and a first base location 32 on the support base. A second support 34 extends between a second support location 36 on the supported structure 22 and a second base location 38 on the support base. A third support 40 extends between a third support location (not visible) on the supported structure 22 and a third base location 42 on the support base.

Figure 2:
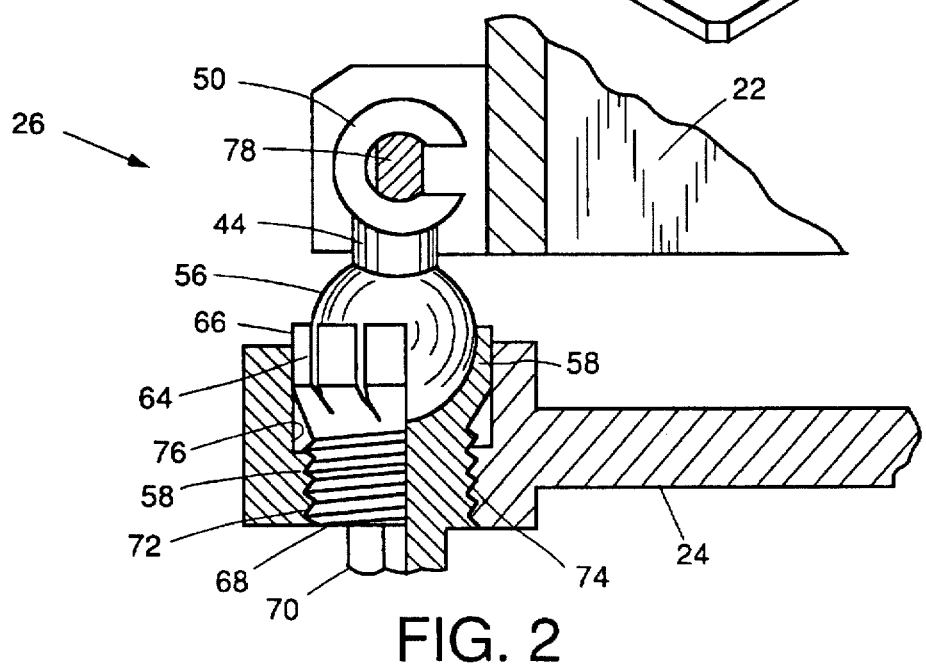
FIG. 2 is an enlarged elevational view of a detail of a support, with portions shown in section.

FIG. 2 illustrates one of the supports 26 in greater detail in its assembled state, and FIGS. 3–7 depict various components of the support 28. The support 28 includes a leg 44, shown separately in FIG. 3, having a first end 46 and a second end 48. A hinge swivel 50 is present at the first end 46. The hinge swivel 50 engages a hinge pin to be described subsequently. In the preferred case, the hinge swivel 50 has the form of an annulus 52 with a slot 54 therein. The inner diameter of the annulus is illustrated as D and the width of the slot is illustrated as L. A spherical ball 56 is present at the second end 48 of the leg 44.

A socket member 58, shown separately in FIG. 4, has a first end 60 and a second end 62. A socket 64 is present at the first end 60. The socket 64 is dimensioned to receive the spherical ball 56 of the leg 44 therein, so that the ball 56 and socket 64 cooperatively form a ball-and-socket joint. In the illustrated approach, the socket 64 is formed of a plurality of circumferentially disposed fingers 66 attached to a socket body. The spherical ball 56 is inserted into the socket 64 by flexing the fingers 66 outwardly as the ball 56 is forced into the socket 64. At complete insertion, the fingers 66 flex inwardly to retain the ball 56 within the socket 64. Retention is aided by a counterbore structure to be discussed subsequently.

The second end 62 of the socket member 58 is in the form of a stud which is externally threaded with a thread 68. Additionally, in this embodiment the second end 62 has a wrench attachment 70 to permit the socket member 58 to be turned by a wrench during adjustment. As shown in the embodiment of FIG. 2, the wrench attachment 70 protrudes below the bottom of the support base 24 to permit access by a wrench to turn the socket member 58. As the socket member 58 is turned, the hinge swivel 50 moves upwardly or downwardly, adjusting the height of the supported structure 22. The socket member 58 can be locked into place, so that the height of the supported structure cannot inadvertently change, by any operable approach, such as by applying a thread-staking liquid, using a self-locking thread insert, or using an intentionally distorted portion of a thread.

The support base 24 includes a bore 72 therethrough, as shown in FIG. 2. The bore 72 is internally threaded with a matching thread 74 to the external thread 68 on the second end of the socket member 58, so that the socket member 58 may be threaded into, and retained within, the bore 72. The bore 72 also desirably has a counterbore 76. The counterbore 76 is sized such that, as the socket member 58 is turned on the threads 68, 74, the fingers 66 of the socket 64 are drawn down and held tightly against the spherical ball 56. The spherical ball 56 is thereby held securely, but still rotatably, within the socket 64.

The supported structure 22 has a hinge pin 78, illustrated in FIGS. 5 and 6, at each of the support locations. The hinge pin 78 is generally cylindrical with a diameter of D' and a cylindrical axis 80. In the preferred embodiment, there is at least one chord flat 82 machined on the hinge pin 78. A chord flat is a flat surface which, in the view of the FIG. 6, makes a chord across the cylindrical surface, and is parallel to the cylindrical axis 80. In the most preferred approach, there are two diametrically opposed chord flats 82 on each hinge pin 78. The spacing between the chord flats is L'. The dimensions of the hinge swivel 50 and the hinge pin 78 are selected such that D' is smaller than D, preferably by about 0.005 inch, and L' is smaller than L, preferably by about 0.005 inch.

These dimensions permit the hinge swivel 50, and thence the leg 44, to be attached to the hinge pin 78 by rotating the leg to a 90 degree position as shown by the solid lines in FIG. 7. The hinge swivel 50 is lowered past the chord flats 82 and thereafter rotated down as shown by the dashed lines in FIG. 7. After the spherical ball 56 is inserted into the socket 54 and the socket member 58 screwed into the threaded bore 72, the hinge swivel 50 is secured to the hinge pin 78 in a manner such that small angular hinge movements are permitted and do not cause a disengagement of the hinge swivel 50 from the hinge pin 78.

FIG. 8 illustrates the supported structure 22, the support base 24, and the supports 26 in a schematic fashion that is useful in discussing the mechanics of the support mode. The first support location 30, second support location 36, and a third support location 84 can be considered as lying in a supported structure plane 85. The first base location 32, second base location 98, and third base location 42 can be considered as lying in a base plane 88. The supports 26 are adjusted so that the two planes 86 and 88 are generally parallel to each other. As used herein, "generally parallel" means that the planes are approximately, but not necessarily exactly, parallel. In this orientation, the supports 26 lie generally, but not necessarily perfectly, perpendicular to the planes 86 and 88. The supports 26 may be oriented such that they are inclined to the planes 86 and 88. The supports 26 are preferably, but not necessarily, of the same lengths.

The hinge pins 78 lie in (or generally parallel to) the supported structure plane 86, with their cylindrical axes 80 perpendicular to respective lines 92 extending from a common single supported structure intersection location 90 in the supported structure plane 88. The lines 92 thus may be viewed as extending "radially" from the location 90 in the sense that they radiate from this central location.

Each hinge swivel 50 pivots about its respective hinge pin 78 in a pivoting plane defined by the respective line 92 and a common line of intersection 94 that is perpendicular to the plane 86 at the location 90. Because the second end of the leg 44 is supported in a rotatable manner in the spherical ball 56, the leg 44 is free to pivot outwardly and inwardly within that pivoting plane responsive to mechanical flexing. Such flexing can result from adjusting the distance (or height) between the support base 24 and the supported structure 22 by turning socket member 58 or by changes in dimensions resulting from thermal expansion differences of the base 24 and the structure 24 or other elements of the system. Stability of the supported structure is assured because of the common intersection of the three pivoting planes along line 94 which is perpendicular to the support base and the supported structure.

This mechanical accommodation is achieved in a structure having only two parts, the leg 44 and the socket member 58, for each support 25. These two parts may be made of a metal such as aluminum alloy by an inexpensive process such as die casting. They may be made from plastic material such as nylon by injection molding. The parts are simple in form, and can be assembled in only one way to the supported structure and the support base.

FIGS. 9–10 illustrate an alternative embodiment of the system 20. Most of the components are the same as described previously, and have been assigned the same reference numerals. In the embodiment of FIGS. 9–10, the upper end of the socket 64 is provided with an outwardly turned external lip 96. That is, in the preferred approach each of the fingers 66 has a portion of the lip 96 formed thereon. A retainer ring 98 has a diameter selected to hold the socket 64 closed to secure the spherical ball 56 when inserted. The retainer ring 98 includes an internal groove 100 sized to receive the lip 96 therein when the retainer ring 98 is positioned to hold the socket 64 closed, so that the retainer ring 98 cannot slip away. FIG. 10 shows this embodiment in its assembled state. This approach has the advantage that no counterbore is required in the support base in order to hold the socket closed, as was used in the embodiment of FIG. 2. This embodiment may be used, therefore, when the support base 24 is quite thin in the region of the attachment of the support. It has the disadvantage, however of requiring the fabrication and assembly of a third part for the support.

As discussed, the rotational position of the socket member 58, and thence the height of the supported structure 22 above the support base 24, is adjustable by turning the socket member 58 on the threads 68 and 72. The wrench attachment 70 of FIG. 2 is one approach for accomplishing the turning.

Another adjustment approach is illustrated in FIGS. 11–12. In this embodiment, the socket member 58 has no wrench attachment at the bottom, but instead has an external adjustment gear surface 102 thereon. An adjustment tool 104 has a matching gear surface 106 thereon. To accomplish the adjustment, the adjustment tool 104 is placed next to the socket member 58 so that the gear surfaces 102 and 106 mesh. This positioning may be facilitated by providing a pilot bore 108 in the support base 24 and a corresponding pilot 110 on the end of the tool 104. The pilot 110 is inserted into the pilot bore 108, thereby automatically correctly engaging the gear surfaces 102 and 104. Adjustment is achieved by turning the adjustment tool 104 as needed. When adjustment is completed, tool 104 is removed.

A variation of the support 26 is illustrated in FIGS. 13–14. In prior embodiments, the ball 56 is located on the second end 48 of the leg 44 and faces downwardly, and the socket 64 is located on the first end 60 of the socket member 58 and faces upwardly. In the embodiment of FIGS. 13–14, the socket 64 is located on the on the second end 48 of the leg 44 and faces downwardly, and the ball 56 is located on the first end 60 of the socket member 58 and faces upwardly. The embodiment of FIGS. 13–14 is otherwise similar to that of FIGS. 11–12, whose description is incorporated here. The reversal of the positions of the ball and socket as shown in FIGS. 13–14 is illustrated in relation to the embodiment of FIGS. 11–12, but can be used in relation to any of the embodiments of the invention.

Figure 15:
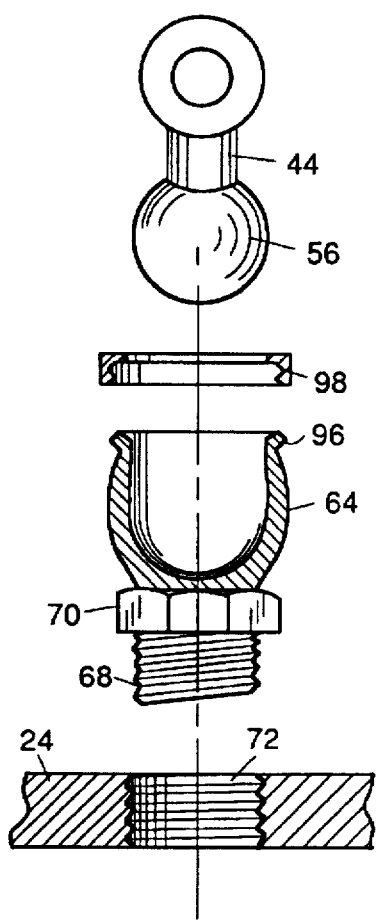
FIG. 15 is an exploded perspective view of another embodiment of the invention using a hex-nut for top-side adjustment.
Figure 16:
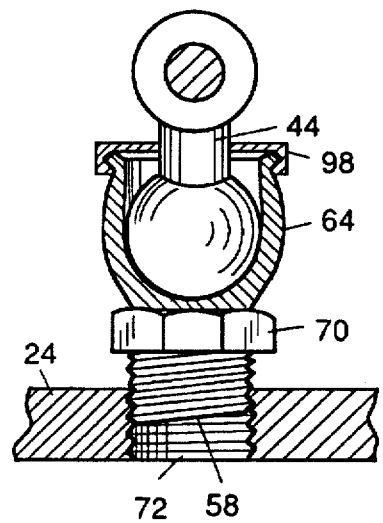
FIG. 16 is a sectional view of the embodiment of FIG. 15, after assembly.

Another version of the support 26 is illustrated in FIGS. 15–16. In this embodiment, the wrench attachment 70, illustrated as a hex nut, is positioned above the threads 68 rather than below the threads 68 as in FIG. 2, and there is no gear surface 102. This repositioning of the wrench attachment 70 permits the vertical positioning of the leg 44 to be accomplished from above the support base 24 rather than from below the support base 24, as in FIG. 2. The embodiment of FIGS. 15–16 is otherwise similar to that of FIGS. 11–12 as to the support 25, whose description is incorporated here. The embodiment of FIGS. 15–16 additionally differs from that of FIGS. 11–12 in that no adjustment tool 104 and pilot hole 108 are required. The positioning of the wrench adjustment can be used in relation to other embodiments of the invention, such as that of FIGS. 13–14.

Figure 17:
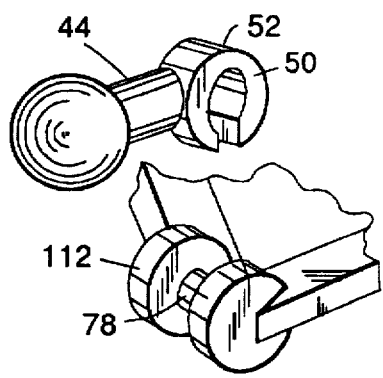
FIG. 17 is a perspective view of another embodiment of the hinge pin and leg.

FIG. 17 illustrates a further embodiment related to the hinge pin 78. The hinge pin 78 may be made just barely long enough to receive the annular length of the hinge swivel 50 thereon. The length of the hinge pin 78 is defined by side constraints 112. In this case, sideways movement of the hinge swivel 50 and thence the leg 44 is constrained, so that stresses cannot be unintentionally applied to the supported structure 22 through the leg 44. This feature is particularly useful when the supported structure is a compliant material such as a plastic optical component.

Figure 18:
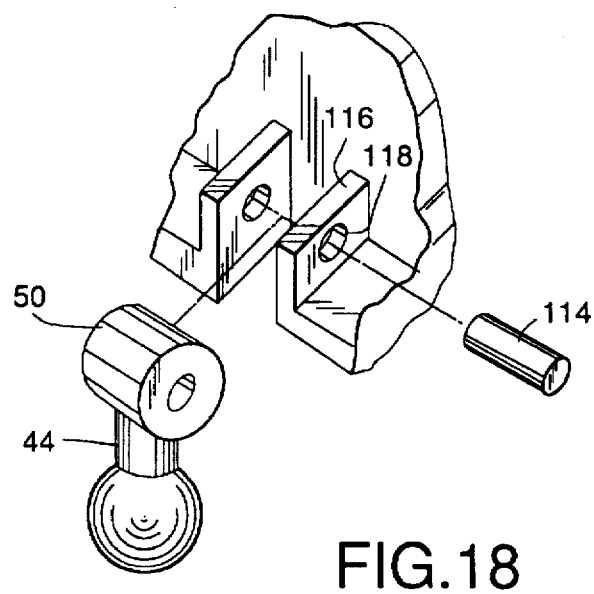
FIG. 18 is a perspective exploded view of another embodiment of the hinge pin and leg.

FIG. 18 illustrates yet another embodiment of a hinge pin 114. Here, the hinge pin 114 is cylindrical, without chord flats. The hinge pin 114 is supported in receivers 116. The hinge swivel 50 is annular, without any slot therein. The hinge pin and hinge swivel are assembled by placing the hinge swivel 50 between the receivers 116, and inserting the hinge pin 114 through a bore 118 therein. This approach is useful when it is desired to contact the full diameter of pin 114 and the full diameter of the bore 118 in place of the flat-sided pin 78 and the open slotted bore of hinge 50. It requires that the hinge pin 114 be held in place by an interference fit with the bore 118 or by a spline knurl at one end of the pin 114 that will lock into one wall of the receiver 116.

FIGS. 19–21 illustrate an embodiment which can be practiced with a modification of a commercially available ball-and-socket joint 119, with the type of approach otherwise illustrated in FIG. 18. The ball-and-socket joint 119 includes the socket member 58, the ball 56, and the leg 44. The hinge swivel 50 is affixed to the first (upper) end 46 of the leg 44. A stud 120 is affixed to the second (lower) end of the socket member 58. The stud 120 has the external threads 58 that are threadably engaged to corresponding internal threads 74 in the support base 24 (FIG. 20). The stud 120 has an Allen-drive socket 122 in its base that permits the stud 120 to be turned in the threads 74 by inserting an Allen wrench (not shown) into the socket 122 (FIG. 21).

In a variation shown in FIG. 22, the Allen-drive socket is replaced by wrench attachment 70, by which the stud 120 can be turned in the threads 74. The embodiment of FIG. 22 also includes a locking insert 123 such as a nylon nylock insert in the threads 68. The locking insert 123 locks the threads 68 in position to prevent inadvertent rotation of the socket member.

FIG. 23 depicts another embodiment 124 in which the ball 56 is supported on the stud 120. The socket member 58 overlies the ball 56. The leg 44 and thence the hinge swivel 50 are supported on an extension 125 that extends laterally from the side of the socket member 58. As discussed previously, these various features can be used in an interchangeable manner where operable. Thus, for example, the extension 125 could be used with the embodiment of FIG. 13, where the geometry of the system required the lateral displacement produced by the extension 125.

The present invention provides an inexpensive, reliable, highly adaptable approach for supporting and adjusting two components relative to each other. Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A support and adjustment system, comprising:
   a first structure;
   a second structure; and
   a support device extending between the first structure and the second structure, the support device including a first support and a second support, each of the first support and the second support having a hinge pin fixed to the first structure,
   a leg having a first end and a second end, the leg including a hinge swivel dimensioned to engage the hinge pin at the first end of the leg such that angular hinge pivoting movements of the leg on the hinge pin are freely permitted, and, at the second end of the leg, a first one of a group consisting of a spherical ball and a socket dimensioned to receive the spherical ball,
   a second one of the group consisting of the spherical ball and the socket dimensioned to receive the spherical ball therein, and
   means for adjustably joining the second one of the group consisting of the spherical ball and the socket dimensioned to receive the spherical ball therein to the second structure.

2. The system of claim 1, wherein the first structure comprises a supported structure.

3. The system of claim 1, wherein the first structure comprises an optical assembly.

4. The system of claim 1, wherein the second structure comprises a support base.

5. The system of claim 1, wherein the support device includes three supports, each support having the structure recited in claim 1.

6. The system of claim 1, wherein the means for adjustably joining includes
   an external thread on the second one of the group consisting of the spherical ball and the socket dimensioned to receive the spherical ball therein, and
   a bore in the second structure having a matching internal thread to the external thread.

7. The system of claim 1, wherein the hinge swivel comprises an annulus.

8. The system of claim 1, wherein the hinge swivel comprises an annulus having a slot therein.

9. A support and adjustment system, comprising:
   a first structure;
   a second structure; and
   a support device extending between the first structure and the second structure, the support device including a support having
   a hinge pin fixed to the first structure, wherein the hinge pin is cylindrical with a cylindrical axis, and wherein the hinge pin further includes at least one chord flat lying parallel to the cylindrical axis,
   a leg having a first end and a second end, the leg including a hinge swivel dimensioned to engage the hinge pin at the first end of the leg, and, at the second end of the leg, a first one of a group consisting of a spherical ball and a socket dimensioned to receive the spherical ball,
   a second one of the group consisting of the spherical ball and the socket dimensioned to receive the spherical ball therein, and
   means for adjustably joining the second one of the group consisting of the spherical ball and the socket dimensioned to receive the spherical ball therein to the second structure.

10. A support and adjustment system, comprising:
    a supported structure having a first support location, a second support location, and a third support location, the three support locations lying in a supported structure plane, for each support location there being defined a pivoting plane passing through the support location and including a line which lies perpendicular to the supported structure plane and is common to each of the pivoting planes;

a support base having a first base location, a second base location, and a third base location, the three base locations lying in a base plane, the supported structure plane being generally parallel to the base plane;

a first support extending between the first support location and the first base location, a second support extending between the second support location and the second base location, and a third support extending between the third support location and the third base location, each support comprising a hinge pin fixed to the supported structure and having a cylindrical surface with a cylindrical axis thereon, the cylindrical axis of the hinge pin lying in the supported structure plane and perpendicular to the pivoting plane, a leg lying generally perpendicular to the supported structure plane and including a first end and a second end, the leg having a hinge swivel dimensioned to receive the hinge pin therein at the first end of the leg, a ball-and-socket joint having a ball and a socket, one of the ball and the socket being joined to the second end of the leg, an externally threaded stud joined to a second one of the ball and the socket, and a bore in the support base having a bore axis lying perpendicular to the base plane, the bore being internally threaded with a matching thread to the external thread of the externally threaded stud.

11. The system of claim 10, wherein the hinge pin further includes at least one chord flat lying parallel to the cylindrical axis.

12. The system of claim 10, wherein the hinge pin further includes a pair of opposing chord flats, each chord flat lying parallel to the cylindrical axis, the chord flats being separated by a chord flat dimension, and wherein the hinge swivel comprises an annulus having a slot therein, the slot having a slot width greater than the chord flat dimension.

13. The system of claim 10, wherein the socket includes an external lip thereon, and wherein the system further includes a retainer ring having an internal groove dimensioned to receive the external lip of the socket therein when the ball is seated within the socket.

14. The system of claim 10, wherein the socket comprises a plurality of fingers formed in the shape of a socket.

15. The system of claim 14, wherein the support base further includes a counterbore in a first end of the bore which lies adjacent to the plurality of fingers when the second end of the socket member is engaged to the bore.

16. The system of claim 10, wherein the stud comprises means for turning the stud relative to the support base.

17. A support and adjustment system, comprising:

a first structure;

a second structure; and a support device extending between the first structure and the second structure, the support device including a first support and a second support, each of the first support and the second support having a ball-and-socket joint, the ball-and-socket joint having a pair of joint members including a ball and a socket, and further having a leg extending from a first one of the pair of joint members, means for hingedly attaching the leg to a first one of the first structure and the second structure such that angular hinge pivoting movements of the leg relative to the first one of the first structure and the second structure are freely permitted, and means for adjustably joining a second one of the pair of joint members to a second one of the first structure and the second structure.

18. The system of claim 17, wherein the support device includes three supports, each support having the structure recited in claim 17.

19. The system of claim 18, wherein the means for rotationally attaching of each support includes means for permitting rotation in a plane of rotation, and wherein the planes of rotation of the three supports intersect in a common line.

20. The system of claim 17, wherein the means for adjustably joining includes a threaded attachment.

* * * * *